United States Patent Office 3,420,047
Patented Jan. 7, 1969

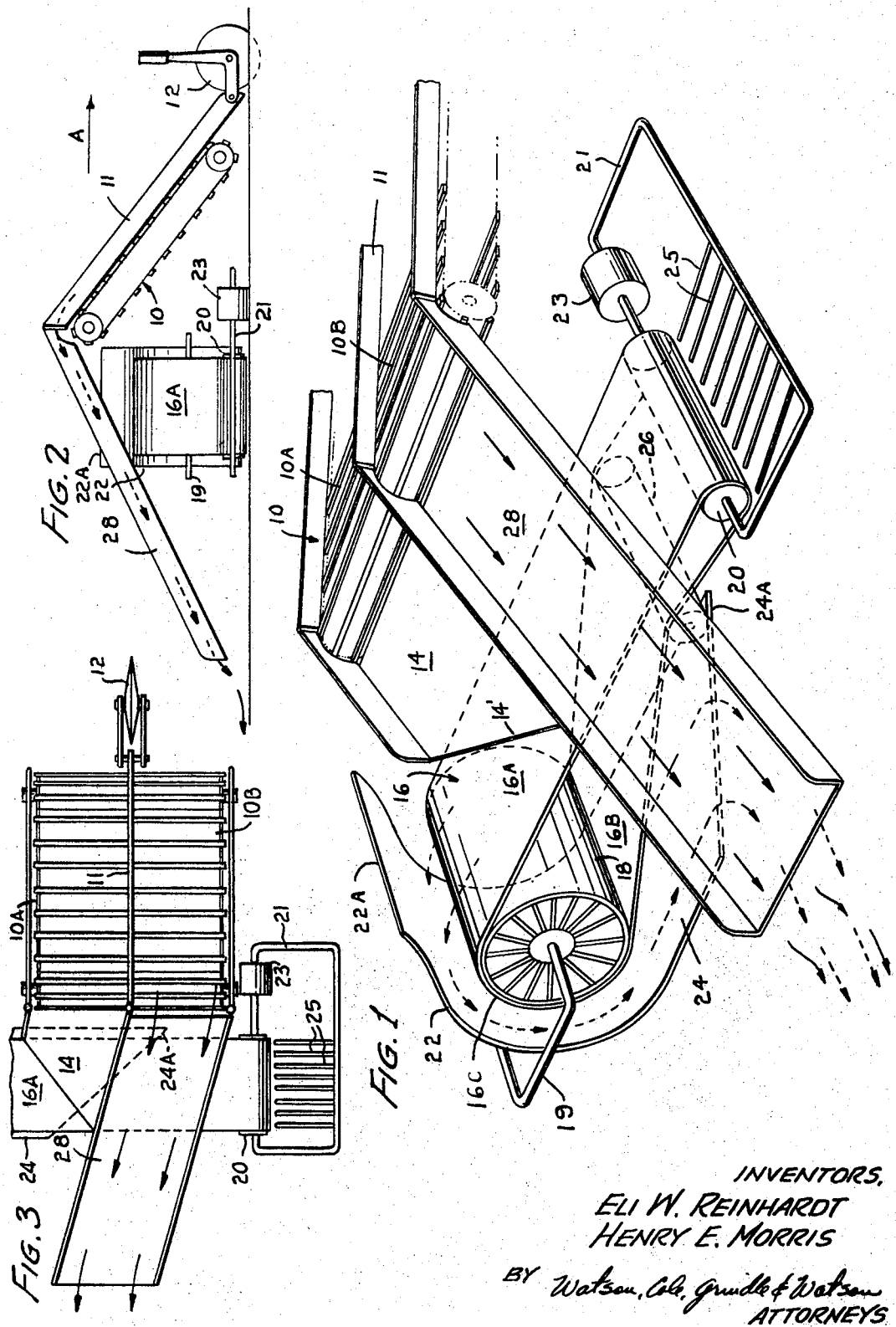

3,420,047
PEANUT HARVESTING MACHINE
Eli W. Reinhardt and Henry E. Morris,
Ashburn, Ga. 31714
Filed Dec. 13, 1965, Ser. No. 514,173
U.S. Cl. 56—366        7 Claims
Int. Cl. A01d 81/00

ABSTRACT OF THE DISCLOSURE

Vines with the roots attached are discharged in two separate continuous swaths in one of which the vines in upright position are received on an inverting conveyer which rotates them through substantially 180 degrees about an axis extending generally in the direction of discharge for delivery of the vines onto the ground in an inverted roots-up position. The other swath of upright vines is received on a conveyer which discharges them still in upright position onto the inverted vines, whereby the roots of both vines are supported above the ground and protected from the sun.

Cross-references to related applications

This application is an improvement over our prior application, Ser. No. 488,316, filed Sept. 20, 1965 which, in turn, is a continuation-in-part of our prior application, Ser. No. 439,736, filed Mar. 15, 1965, now abandoned.

Background of the invention

In harvesting peanuts, it is customary to utilize a machine which moves along the rows of peanuts, digging them and frequently shaking and sifting them to remove stones and/or earth which adhere to the roots, then discharging them back onto the ground in upright position as a generally continuous intermatted swath of vines extending rearwardly from the machine. Normally, the vines are left in windrows as thus deposited for a sufficient time to permit drying, following which they are picked up by suitable harvesting and/or combining apparatus for treatment in usual manner.

However, where the vines are thus deposited in roots-down position on the ground, the roots and attached peanuts, by virtue of their contact with the ground, are in an unfavorable position for drying and such that they are subjected to adverse effects by rain. Thus, in the event of rain, while the vines are so positioned, many of the peanuts will be lost to becoming buried in the resulting mud; and, in addition, the stems by which the peanuts are attached to the roots will frequently deteriorate and become weakened with resulting detachment and loss of peanuts at the time an attempt is made to pick up the vines by conventional pick-up machinery.

With these considerations in mind, we have heretofore conceived of an improved peanut digging and windrowing machine, which constitutes the subject matter of our prior applications above referred to, for inverting the vines and for then progressively depositing them on the ground in a continuous windrow of inverted vines extending rearwardly generally along the path traversed by the machine. With such inverted disposition of the vines, the peanuts thereon are directed upwardly in optimum position for exposure to the sun and air and are spaced above the ground by the foliage of the vines themselves. However, where the weather is extremely hot, it has been found that such disposition of the vines may damage the peanuts by inducing germination.

The present invention provides means for overcoming this problem of hot weather damage to the peanuts by providing, in conjunction with the subject matter of our earlier applications, a means or attachment through which the machine of our prior application Ser. No. 488,316 is rendered capable, in a single traverse over multiple rows of peanut vines, of depositing one or more rows in the form of an inverted swath, as in our prior application, and of depositing directly on top of the inverted swath one or more other rows in the form of an upright swath. Thus, in the resulting windrow, the upright swath or layer of vines shades the roots of both swaths, while the inverted lower swath supports the roots of both swaths above the ground, to minimize damage from rain and from ground contact.

Brief description of the drawings

The preferred embodiment of the invention is illustrated in the accompanying drawings in which:

FIGURE 1 is a perspective diagrammatic view of a preferred embodiment of the invention as applied to the discharge end of a ground traversing peanut digging and shaking machine, of which only the discharge end portion thereof is illustrated;

FIGURE 2 is a diagrammatic side elevation of the structure shown in FIGURE 1; and FIGURE 3 is a plan view of the structure shown in FIGURE 2.

Description of the preferred embodiment

Referring now in detail to the accompanying drawings, the numeral 10 designates generally the discharge end portion of the elevating conveyer of a usual peanut digging or harvesting machine, which may be of the type generally exemplified in the U.S. patent to Long, 2,999,-547, granted Sept. 12, 1961. The digging machine is of a well-known type in which the machine, on being towed or propelled forwardly in the direction of the arrow A along rows of peanuts, uproots the peanut vines with attached peanuts, picks up the uprooted vines, and delivers them in a continuous row or rows of intermatted vines onto the elevating conveyor 10 for movement and discharge rearwardly with respect to the movement of the machine.

By means of the divider 11, suitably supported in fixed relation above the conveyer 10, the latter is divided into relatively parallel, but separate, conveyer sections 10A and 10B, which, in effect, function as separate conveyers, each adapted to convey a swath of vines, consisting of one or more rows of vines. For insuring complete separation of the adjoining swaths on the separate conveyer sections 10A and 10B, there is provided a disc cutter 12 which is rotatably supported in advance of the machine, in alignment with the divider. This disc cuts any vine portions, both above and below ground, tending to interconnect the vines of adjacent swaths.

Upon their discharge from the conveyer 10A, the vines are delivered onto the inclined transfer conveyer 14, here shown in the form of a smooth downwardly and rearwardly extending chute which, in turn, deposits them on the inverting conveyer 16 of the preferred embodiment. In the embodiment here illustrated, the conveyer 16 is of the endless type, including generally horizontally disposed upper and lower runs 16A and 16B, the conveyer 16 in its entirety being guided for movement in an endless circuit by the rotatably supported drums 18 and 20 respectively on portions 19 and 21 of the rigid machine frame. In order that the transfer conveyor 14 may distribute the vines substantially across the width of the upper run of the conveyer 16, the discharge edge 14' at the lower end of the transfer conveyer chute extends diagonally across the upper belt run 16A.

The conveyer 16 is so arranged that in operation its upper run moves toward and downwardly around the roll 18, the curved or arcuately moving transition portion 16C of the belt in the present instance thus carrying the vines through a curve of 180 degrees or thereabouts around an axis extending generally parallel to the movement of the machine and defined by the rotational axis of the roll 18, so that, upon completion of this 180 degrees of movement, the vines are completely inverted.

In order to confine the vines in operative engagement with the conveyer transition portion 16C, there is provided a curved guide in the form of a rigid plate 22 which is radially spaced from the roll 18 and the transition portion 16C of the conveyer belt to define therebetween a path of movement for the vines. While the plate or guide 22 is required to encircle the roll and the transition belt section 16C only coextensively with approximately the lower quadrant of the transition portion 16C, it is desirable in the present form that it also extend for substantially a full 180 degrees or more with its upper end terminating in an upwardly flared portion 22A. This flared portion 22A cooperates with the roll 18 and belt 16 to define an inwardly converging mouth for receiving and guiding the vines.

Stripper teeth or tines 25 are carried on the frame portion 21 in proximity to the roll 20 to prevent vines from being carried back onto the upper conveyer run 16A.

A discharge chute 24 preferably extends tangentially from the curved portion of the guide 22 in a horizontal direction and is located just above ground level. Its discharge end is defined by a diagonally extending discharge edge 24A, the purpose of which is to redistribute the discharged and inverted swath of vines over a substantial width.

It has been found desirable to cause the lower run 16B of the inverting conveyer to move gradually away or diverge upwardly from the discharge chute 24 in the direction of movement of the conveyer run 16B, for the purpose of providing an outwardly flaring discharge mouth to facilitate the free discharge and rearward movement of the vines without interference or hindrance by the transversely moving lower conveyer run 16B. To this end, the lower run of the conveyer is deflected upwardly away from the horizontal discharge chute 24 by means such as the roller 26.

It will be seen that the inverted swath of vines discharged rearwardly from the machine, while flowing in a continuous unbroken stream or swath, are nevertheless turned at right angles as they are received on the upper run 16A of the inverting conveyer 16 and are distributed over a substantial portion of the width of the conveyer by the diagonally inclined discharge edge 14' of the transfer chute 14. Then, after being inverted by movement around the drum or roll 18, in engagement with the curved transition portion 16C of the conveyer belt, they emerge in a generally horizontal transverse direction on the discharge chute 24 and are again turned through substantially 90 degrees incident to their passage over the diagonal discharge edge 24A of the chute 24 and onto the ground. Inasmuch as the successive right angular turns of the vines, in passing from the discharge chutes 14 and 24 respectively, are in opposite directions and through equal angles, the vines will be substantially undistorted by their movement through the machine, thereby facilitating the ability of the machine to carry out its functions and to ultimately deposit the vines on the ground in an efficiently formed and continuous windrow.

The foregoing manner of inverting and depositing a swath or windrow on the ground behind the forwardly moving machine is fully disclosed in our pending application Ser. No. 488,316, filed Sept. 20, 1965, hereinbefore mentioned.

The swath of upright vines on the second elevating conveyor or conveyor section 10B are delivered therefrom onto a longitudinal conveyer, in the form of a rearwardly and downwardly sloping chute 28 which extends across and carries the vines rearwardly over the inverting conveyer 14.

The chute 28, which in effect is an extension of the conveyer 10B, is positioned relative to the discharge chute 24, to discharge its swath of upright vines directly onto the swath of inverted vines being discharged by the chute 24. In the resulting windrow of vines, the lower swath will be supported by the tops of the vines in an inverted position, with the roots and peanuts spaced well above the ground. The upper swath of upright vines will have its roots supported above the ground on the roots of the inverted swath, and the tops and/or foliage of the vines of the upper swath will protect all of the roots from direct exposure to the sun.

In this application, we have shown and described only the preferred embodiment, together with a minor modification, of our invention. However, we recognize that our invention is capable of other and different embodiments and that its several details may be modified in various ways without departing from our invention as defined in the accompanying claims.

Having thus described our invention, we claim:

1. In a peanut harvesting machine of the class which, incident to its ground traversing movement along multiple rows of vines, picks up said vines with their roots attached, and which includes conveying means for carrying said multiple rows of vines in upright position and in parallel relation to each other in a rearward direction with respect to the movement of the machine for discharge, the improvements which include:

an inverting conveyer positioned rearwardly of said conveying means to receive at least one row of vines from the conveying means and to discharge said row onto the ground as a continuous swath of inverted vines extending rearwardly from the machine, and an upright conveyer defining a rearward extension of said conveying means and positioned rearwardly thereof to receive at least one row of vines in upright position from the conveying means, said last-mentioned conveyer terminating rearwardly at a location over the said swath of inverted vines, to discharge vines in upright position as a continuous swath directly on top of said swath of inverted vines.

2. In a peanut harvesting machine as defined in claim 1, the further improvements wherein said conveying means comprises an elevating conveyor divided into a pair of relatively parallel elevating sections for carrying vines respectively to said inverting conveyor and to said upright conveyer.

3. In a peanut harvesting machine as defined in claim 2, the further improvement including a vine cutting means supported from said machine in advance thereof and at a transverse location medially between the conveyer of said pair, whereby to sever any portions of said vines extending between adjoining rows of vines to be received on the respective conveyers of said pair.

4. In a peanut harvesting machine as defined in claim 1, the further improvement wherein said conveying means comprises an endless elevating conveyer having a rearwardly moving upper run terminating in a horizontally disposed discharge end, said inverting and upright conveyers respectively communicating with said discharge ends on opposite sides of a vertical plane which extends medially of the width of said upper run and parallel to the movement thereof, in combination with a divider fixedly supported over said upper run and in said vertical plane.

5. In a peanut harvesting machine as defined in claim 4, the further improvement which includes a cutter disc supported from the machine for engagement with the ground in advance of the said conveying means and substantially in said vertical plane.

6. In a peanut harvesting machine as defined in claim 1, the further improvement wherein said inverting conveyer includes means defining a vine conveying element having a portion which moves in an arcuate path about a horizontal axis generally aligned with the transversing movement of the machine, an arcuate guide means concentric to said path and spaced therefrom to confine the vines against said portion of the inverting conveyer during their inversion movement.

7. In a peanut harvesting machine as defined in claim 6, the further improvement including a generally horizontal discharge chute extending tangentially from the lower periphery of said guide means and terminating substantially beneath said upright vine conveyer.

References Cited

UNITED STATES PATENTS

| 2,391,427 | 12/1945 | Kucera | 56—370 |
| 2,667,731 | 2/1954 | Nerness | 56—372 |
| 2,679,720 | 6/1954 | Cymara | 56—370 |
| 3,260,314 | 7/1966 | Edwards | 171—101 |

ANTONIO F. GUIDA, *Primary Examiner.*

U.S. Cl. X.R.

56—182, 370; 171—101